United States Patent [19]
Baines

[11] Patent Number: 5,529,252
[45] Date of Patent: Jun. 25, 1996

[54] PEERLESS GARLIC PRESS

[76] Inventor: Tom R. Baines, 1458 Glenwood Dr., Gardnerville, Nev. 89410

[21] Appl. No.: 365,564

[22] Filed: Dec. 28, 1994

[51] Int. Cl.⁶ ...................................................... A47J 19/00
[52] U.S. Cl. .......................................... 241/95; 241/169.2
[58] Field of Search ................................ 241/169.2, 169, 241/95; D7/665, 678, 679, 372; 100/125

[56] References Cited

U.S. PATENT DOCUMENTS

| | | |
|---|---|---|
| 344,506 | 6/1886 | Strang . |
| 1,418,108 | 5/1922 | Trust et al. ............................ 241/95 X |
| 2,701,593 | 2/1955 | Dootson . |
| 4,714,205 | 12/1987 | Steinko ............................ 241/169.2 X |
| 5,163,362 | 11/1992 | Gaber et al. . |
| 5,165,335 | 11/1992 | Bianchi . |

FOREIGN PATENT DOCUMENTS 2022235  12/1992  WIPO ...................................... 241/95

*Primary Examiner*—Mark Rosenbaum

[57] ABSTRACT

A unique garlic press having a cylinder (20) in which cloves of garlic are placed for mincing. The cylinders bottom end has five small orificies (28) thru which garlic is forced when the ram (12) is hit with the mallet (14). A set of legs (18) elevates the press to a height that allows room for the minced garlic beneath the press. The press is easily cleaned by pushing the garlic out of the five orificies (28) with the clean out rod (16). Then with the cylinder top under running water the ram (12) is used as a plunger. Mallet (14) is held to body (10) by hanger (22).

1 Claim, 7 Drawing Sheets

PEERLESS GARLIC PRESS

CROSS REFERENCES TO RELATED APPLICATIONS

This invention uses the body, ram, and legs of my pending design patent application, Ser. No. 29/028,278 filed Sep. 9, 1994.

BACKGROUND—FIELD OF INVENTION

This invention relates to food processing, specifically to mincing garlic.

BACKGROUND—DISCUSSION OF PRIOR ART

In general, garlic presses are unnecessarily complicated. They operate by a plier type action, thread driven ram, or lever driven piston. The operator of some ends up having more garlic on the tool and himself than in a container. Others produce minced garlic that has many small chunks and much of it is stringy like sausage or hamburger meat. This is because the ram or piston forces the garlic cloves through the multiple orificies without crushing it first.

Heretofore, such garlic presses generally have had grates, sieves, corners, crevices, threads, and a multiplicity of orificies which retain sticky residue from the garlic making them difficult to clean. The difficulty of cleaning garlic presses is attested to by the appearance on the market of garlic presses advertised to be self cleaning.

Most garlic presses are not properly designed or sturdily enough constructed to mince a lot of garlic cloves quickly and well.

OBJECTS AND ADVANTAGES

Accordingly, several objects and advantages of my invention are to provide a garlic press that actually is easy to clean. This feature is made possible by reducing the number of orificies used to five, the elimination of grates, sieves, corners, crevices, and threads, providing a ram that when used as a plunger forces a lot of water at high pressure through all areas having residual garlic.

This invention makes available a garlic press that is capable of mincing many cloves of garlic quickly and well. This is accomplished by the pressure created in the cylinder designed with only five orificies and the fitting ram being struck by a mallet. The pressure and churning action crushes the garlic before forcing it thru the orificies.

Uniqueness makes this garlic press an attractive accent piece.

Further objects and advantages of my invention will become apparent from a consideration of the drawings and ensuing description.

DRAWING FIGURES FIG. 1 is a perspective view of a garlic press according to my invention assembled as a unit.

REFERENCE NUMERALS IN DRAWINGS

10 press body
12 Ram
14 Mallet
16 Clean out Rod
18 Leg
20 Cylinder
22 Hangar
24 Clean out Rod Hole
26 Hangar Mating Hole
28 Orificies

BEST MODE FOR CARRYING OUT THE INVENTION.

Figure 1:
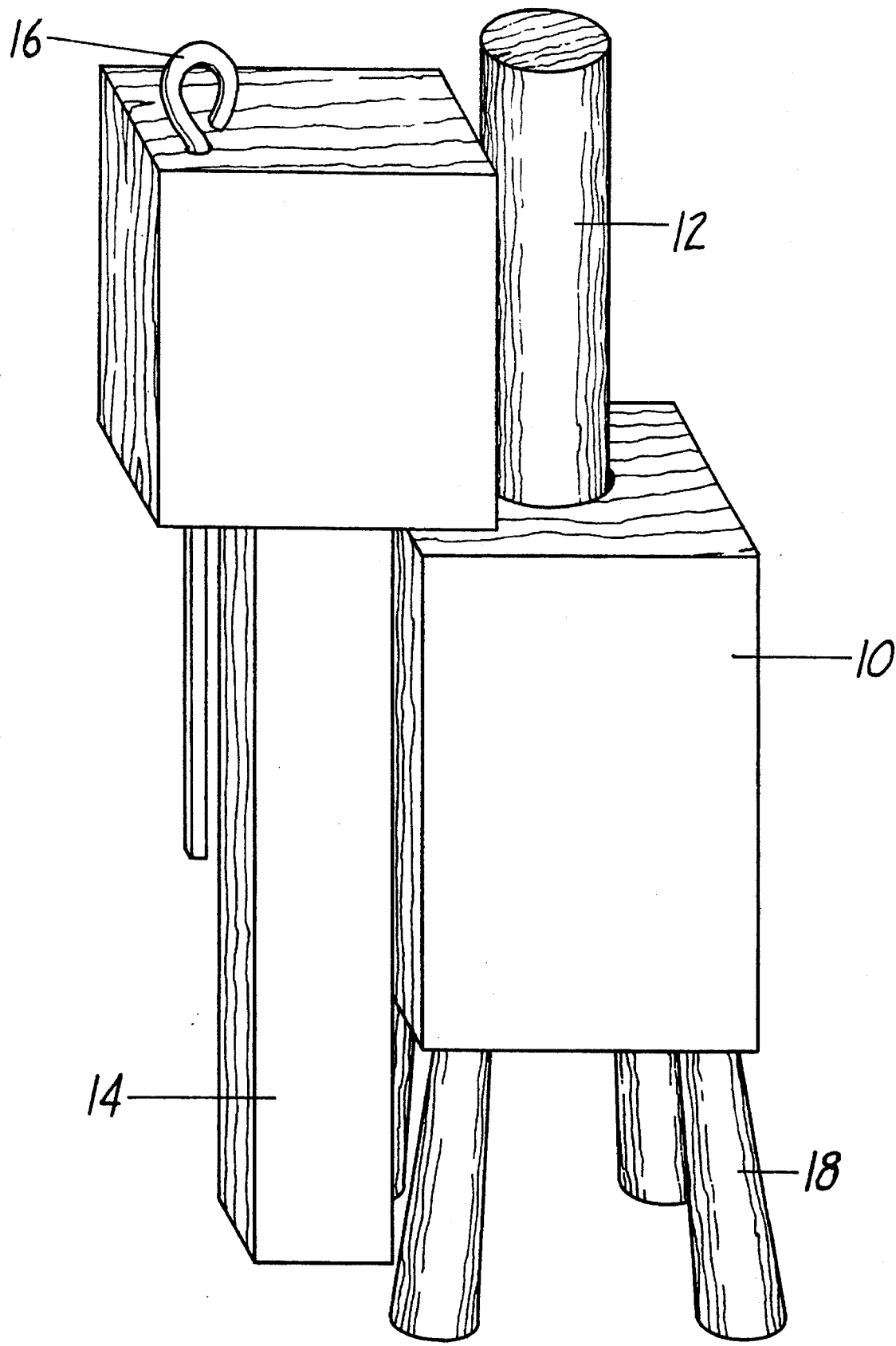
Figure 2:
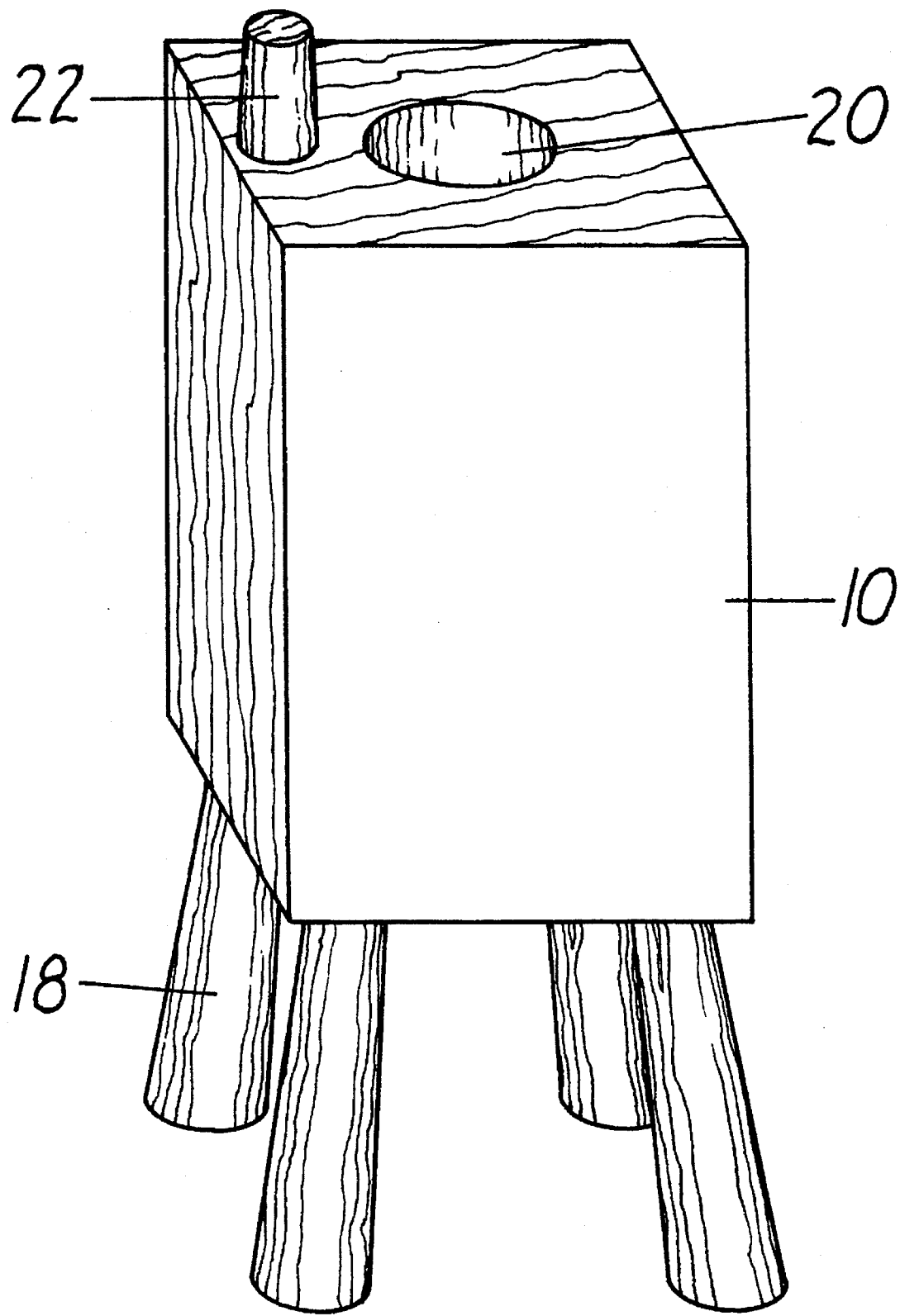
FIG. 2 is a perspective view of the press body showing the cylinder, legs, and the hangar.
Figure 3:
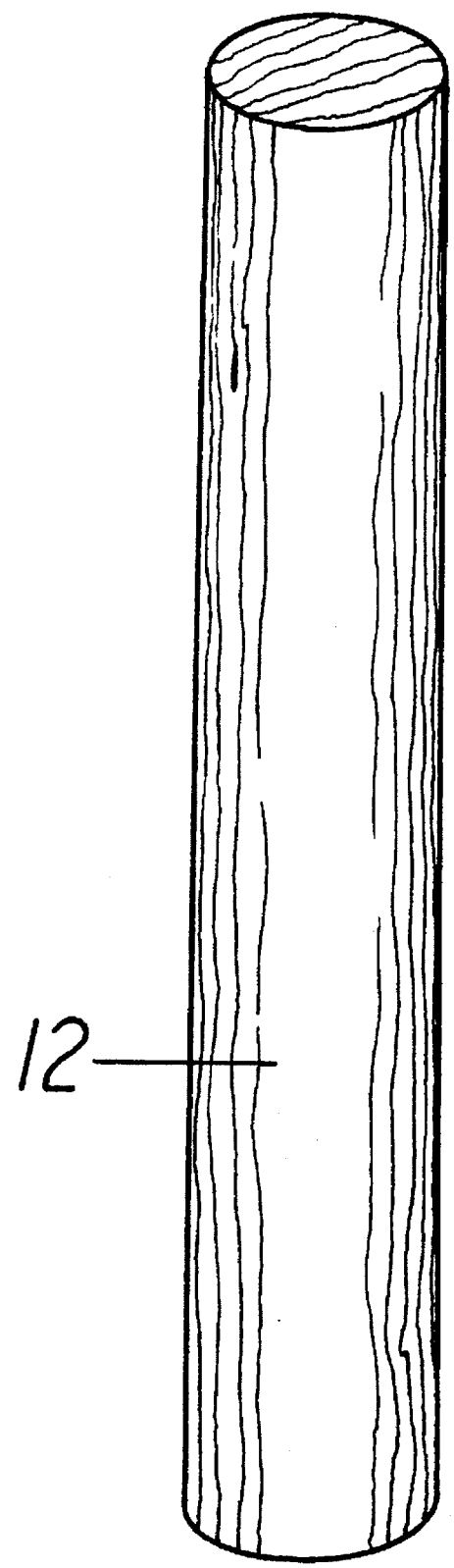
FIG. 3 shows a perspective view of the ram.
Figure 4:
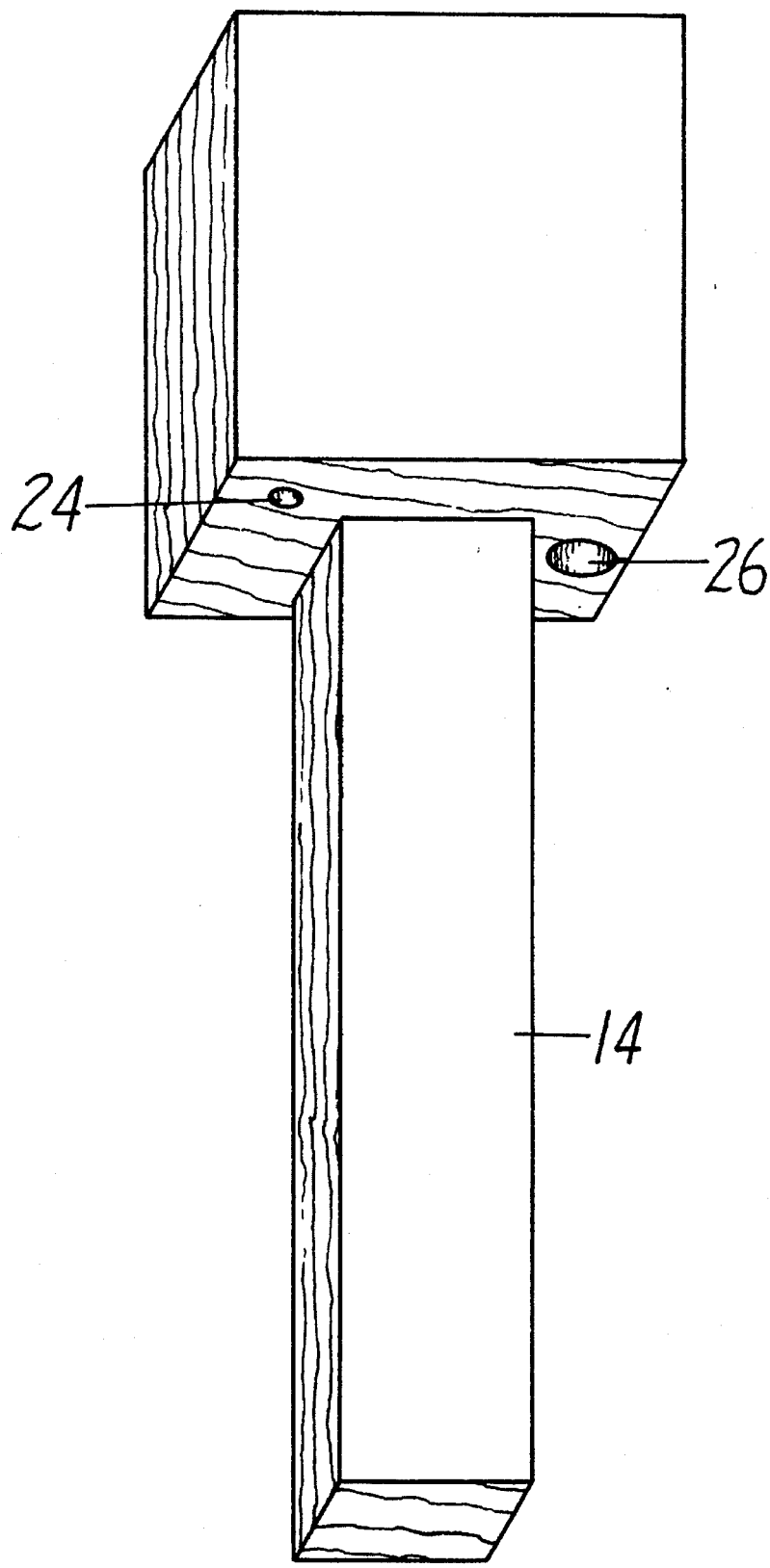
FIG. 4 shows a perspective view of the mallet with a mating hole for the hangar and a hole for the storage of the clean out rod.

FIG. 1 shows a garlic press according to my invention. This press is made of oak. It comprises a body 10 with a cylinder 20. Five orificies 28 are located at the bottom of the body 10. A hangar 22, that conforms with mating hole 26, is located on body 10.

The ram 12 fits into the cylinder 20.

The mallet 14 has a clean out rod hole 24 and a hangar mating hole 26.

Figure 5:
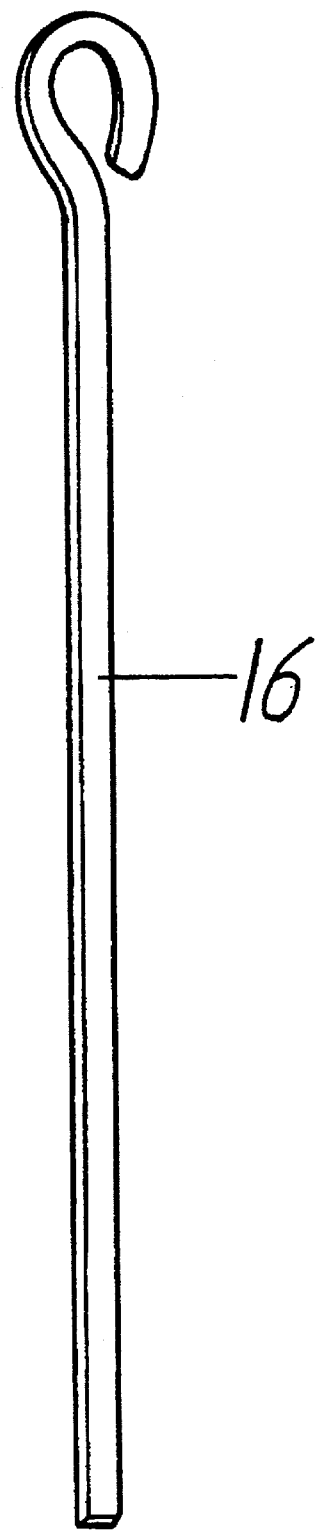
FIG. 5 shows a perspective view of the clean out rod.
Figure 6:
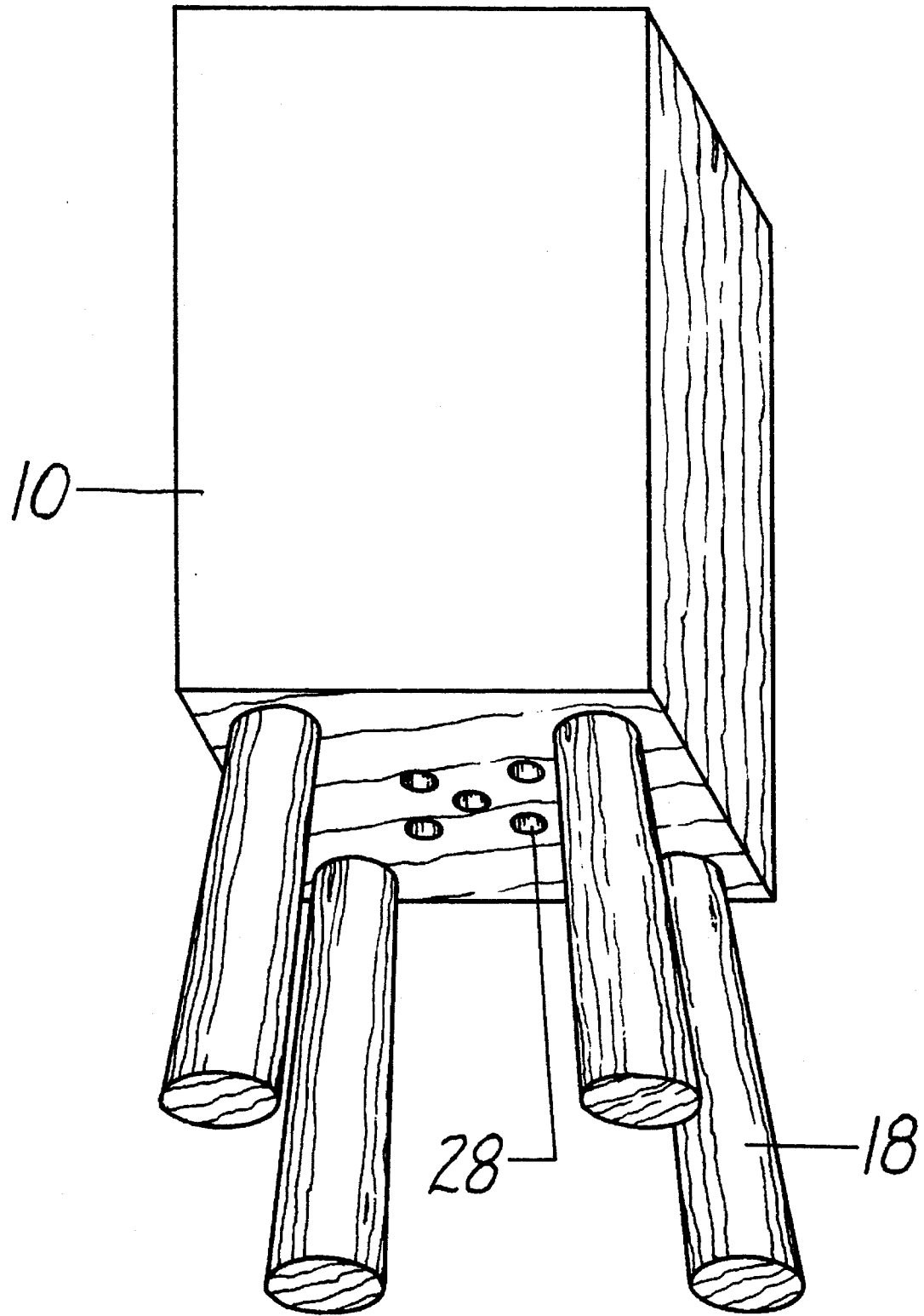
FIG. 6 shows a perspective view of the bottom of the press body with the legs and orificies.
Figure 7:
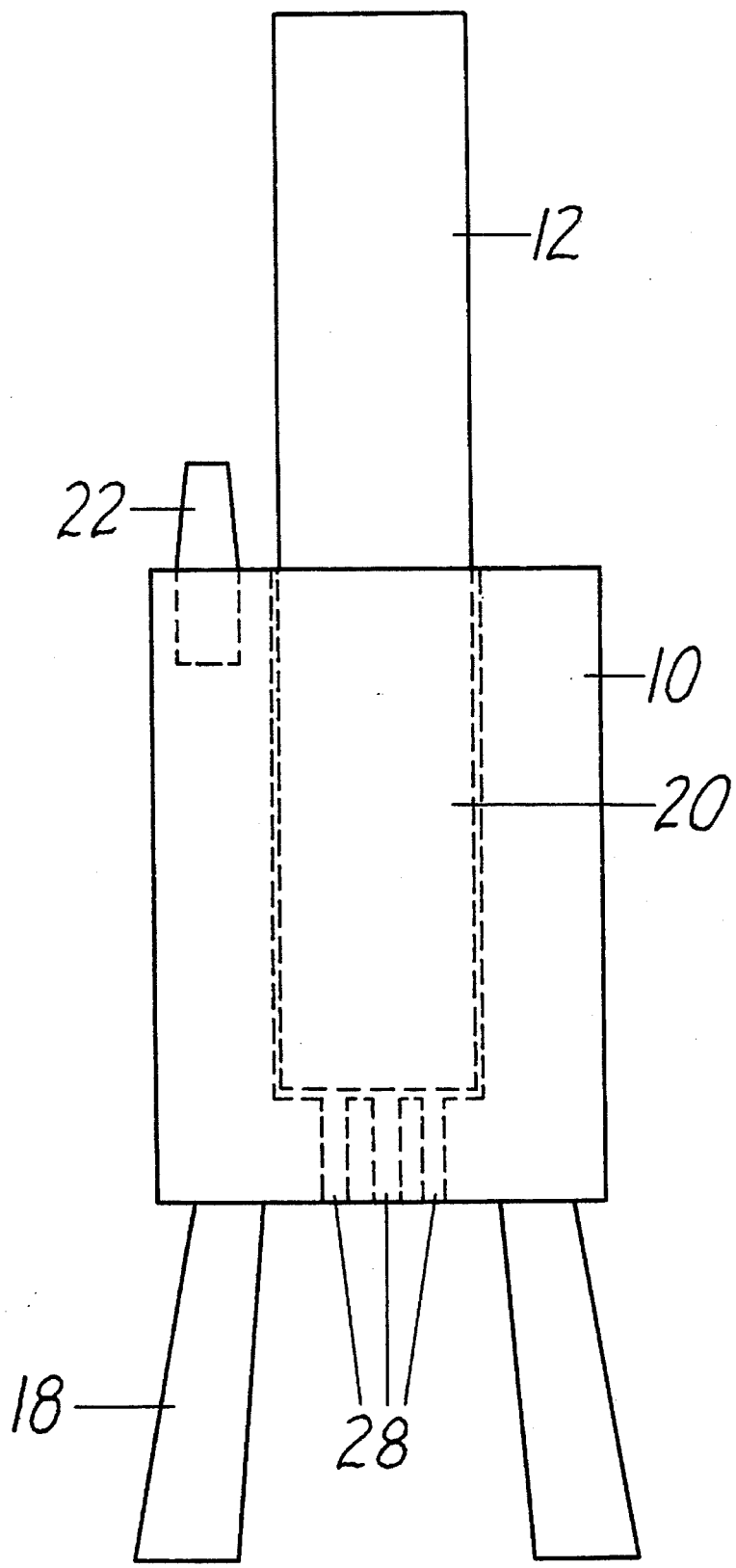
FIG. 7 is an engineering drawing showing the press body with orificies, cylinder, legs, ram, and hangar.

The clean out rod 16 is shown in FIG. 5.

OPERATION OF PREFERRED EMBODIMENT

In operation, mallet 14 is removed from hangar 22, clean out rod 16 is removed from mallet 14 and ram 12 is removed from cylinder 20.

Garlic cloves are then placed in cylinder 20. The ram 12 is inserted over the cloves in cylinder 20 and hit with mallet 14 crushing and forcing the garlic thru orificies 28.

The garlic press is then cleaned by pushing the garlic out of orificies 28 with clean out rod 16. Then with the top of cylinder 20 under running water ram 12 is used as a plunger.

CONCLUSION, RAMIFICATIONS, AND SCOPE OF INVENTION

Thus, the reader will see that my oak garlic press is an attractive accent piece, has the ability to mince a lot of garlic well and quickly, and actually is easily cleaned.

While my above description contains many specifities, these should not be construed as limitations on the scope of the invention, but rather as an exemplification of one preferred embodiment thereof. Many other variations are possible. For example, the press can be held together by a method other than a piece of dowel used as a hangar and located at the top of the body. The press body can be made circular, triangular, or many other shapes. The body can be elevated by many other methods than legs, and does not have to be elevated at all. The material for manufacture can be many things other than oak. The meeting point of ram and cylinder bottom end could be different such as concave or convex. The press body does not need to be made from a solid block. Things other than garlic can be minced or juiced with this press.

Accordingly, the scope of the invention should be determined not by the embodiments illustrated but by the appended claims and their legal equivalents.

The invention claimed:

1. A press for mincing food stuff in particular garlic, comprising;

a press body containing a cylinder of sufficient size for placing cloves or garlic;

a plurality of orificies at the bottom end of said cylinder of a size that facilitates the mincing of garlic;

a piece of dowel attached to said press body that provides a means for holding said press together as a unit;

a ram that mates conformingly with the cylinder;

a mallet or other hammer like implement for hitting; said ram with sufficient force to crush and crush the garlic thru said orificies;

a plurality of legs or other means for elevating the press body to a height that allows room for the minced garlic beneath the press body;

a clean out rod for the removal of garlic in the orificies.

* * * * *